3,059,025
SEPARATION OF HIGH PURITY ISOPHTHALIC ACID
James O. Knobloch, Hobart, and Delbert H. Meyer, Highland, Ind., assignors to Standard Oil Company, Chicago, Ill., a corporation of Indiana
No Drawing. Filed Aug. 21, 1958, Ser. No. 756,305
8 Claims. (Cl. 260—525)

This invention relates to the separation of isophthalic acid from mixtures of isophthalic acid and terephthalic acid and more specifically pertains to the recovery of high purity isophthalic acid from such mixtures through the use of pyridine.

The separation of mixtures of isophthalic acid and terephthalic acid into products containing high purity isophthalic acid, that is of at least 95% isophthalic acid is a problem which has confronted the art for some time. Since it has been appreciated for some time that it would be more desirable to produce phthalic acids by oxidizing mixtures of the isomeric dialkylbenzenes and especially mixtures of isomeric xylenes, rather than separating the individual isomeric dialkylbenzenes, a considerable amount of investigation of means for separating the resulting isomeric phthalic acids have been undertaken. Since ortho-phthalic acid is considerably more soluble than either isophthalic acid or terephthalic acid, the separation of ortho-phthalic acid from a mixture of the isomeric phthalic acids can be readily accomplished. However, after the ortho-phthalic acid has been removed, there remains a mixture of isophthalic acid and terephthalic acid. These residual mixtures cannot be separated by fractional distillation because of the close high boiling point of isophthalic and terephthalic acid. Also because of their high boiling points there is the problem of decomposition and discoloration of the products. Also, terephthalic acid has a tendency to sublime, resulting in the plugging of distillation equipment. Thus, more complicated separation procedures than simple fractionation have been proposed to separate isophthalic acid and terephthalic acid. One of such complex separations proposed was to convert the mixture of acids to their esters, especially with a lower aliphatic alcohol. However, the boiling points of the esters of isophthalic acid and terephthalic acid were found to be too close and thus effective separation by fractionation could not be accomplished, especially on an industrial scale. Separation of isophthalic acid from a terephthalic acid by fractional esterification with an alcohol until isophthalic acid and any monobasic acid present is esterified followed by separating unesterified terephthalic acid from the esters has been proposed. If isophthalic acid is desired, the ester must be hydrolyzed. Proposed separations involving the formation of metal salts of the mixture of isophthalic acid and terephthalic acid provided little advantage since, in general, separation of the mixture of metal salts does not yield products of above 95% purity. Separation of isophthalic acid from admixture with terephthalic acid by forming ammonium salts has the disadvantage of requiring the use of acid to spring the phthalic acid products.

It has now been discovered that certain mixtures of isophthalic acid and terephthalic acid can be separated by the use of pyridine. The process comprises reacting a mixture containing less than 95% isophthalic acid and more than 5% terephthalic acid, both by weight, with from one to four mols of pyridine per mol of phthalic acid in the mixture at a temperature above 20° C. up to 200° C. or higher, to form a clear liquid phase. Any remaining solid or extrahend is separated from the liqiud phase. The liquid phase is then cooled to crystallize a pyridine salt of isophthalic acid and this pyridine salt is decomposed at temperatures up to the boiling point of pyridine, 115–116° C. at atmospheric pressure, or up to the corresponding boiling point at sub- or super-atmospheric pressures. The pyridine salt can be decomposed by passing heated air, steam or other inert gas over or through the salt. The released pyridine can be recovered for reuse.

The process of this invention can be carried out in the presence of water and it is preferred to have at least 0.5 part by weight water per part of pyridine by weight in the extract solution prior to the crystallization step. The amount of water can vary from 0.5 to 40 parts by weight per part of pyridine by weight employed and it is preferred to use from 1 to 20 parts by weight of water per part of pyridine by weight. Water need not be present when pyridine is reacted with the mixture of isophthalic acid and terephthalic acid, for, as it will be hereinafter seen, the pyridine salt can be first formed in the absence of water and then water added.

The process of this invention can be used with any mixture of isophthalic acid and terephthalic acid containing less than 95% isophthalic acid by weight. However, since mixtures containing 80 to 90% isophthalic acid and 10 to 20% terephthalic acid by weight can be obtained from mixtures containing more than 20% terephthalic acid by weight by simple extraction processes using such solvents as water, acetic acid, alcohols, ketones and the like, it will be found highly advantageous to use pyridine according to the process of this invention to separate isophthalic acid from admixture with terephthalic acid where the isophthalic acid content is only in the range of 80 to 90%, for by so doing an isophthalic acid product of at least 95% is produced.

It is further contemplated to employ the process of this invention on a cyclic basis. That is, first contacting the mixture of isophthalic acid and terephthalic acid with pyridine, preferably forming a clear aqueous solution of the resulting pyridine salts, separating the liquid phase from the first undissolved solid or first extrahend, and crystallizing and recovering as the first and the only solid fraction from the first liquid phase an isophthalic acid pyridine salt product. This product will contain the isophthalic acid pyridine salt in an amount of at least 95% of the solid recovered. The remaining liquid is combined with an amount of pyridine no more than that equal to the amount of pyridine in said first crystallized product, but at least sufficient to provide the 1 to 4 mols per mol of phthalic acid in the first extrahend. The first extrahend undissolved solid is reacted with said first mother liquor fortified with pyridine to form a second clear solution. The second clear liquid phase is separated from a second extrahend. A second isophthalic acid pyridine salt product is crystallized and recovered from said second clear liquid phase. This crystalline product also contains at least 95% isophthalic acid pyridine salt. The step of fortifying with pyridine the mother liquor remaining after recovery of the solid of high isophthalic acid pyridine salt content, the step of reacting the pyridine fortified mother liquor with the extrahend to form a clear solution and the step of crystallizing and recovering the isophthalic acid pyridine salt can be repeated until there is produced a gross isophthalic acid pyridine salt product, a combination of all of the products crystallized from solution, of at least 95% isophthalic acid pyridine salt content and leave behind as a final undissolved solid or final extrahend a terephthalic acid product of greater than 99% purity. Isophthalic acid is readily recovered from the pyridine salt as hereinbefore described.

One method of carrying out the process of this invention comprises contacting the mixture of isophthalic acid and terephthalic acid with pyridine in an amount of from 1 to 4 mols of pyridine per mol of phthalic acid in said mixture, at a temperature above 50° C. up to 200° C. or above but preferably not above the boiling point of the mixture. The heating of the mixture of pyridine and the mixed acids is continued until a clear solution is formed. Cooling of this clear solution to a temperature in the range of 20° to 30° C. will result in a product containing at least 95% of the isophthalic acid pyridine salt. The separation of this salt from the remaining liquid can be accomplished by phase separation as for example, by filtration. Heating the recovered solid at temperatures up to the boiling point of pyridine, preferably 90 to 100° C., will produce an isophthalic acid product containing at least 95% isophthalic acid.

By a preferred embodiment of the process of this invention the mixture of isophthalic acid and terephthalic acid is contacted with an aqueous solution of pyridine containing on a weight basis of about 10 to 20, more desirably about 15, parts of water per part of pyridine. The mixture is heated to a temperature from 85 to 95° C. to form a clear solution. By this preferred embodiment a crystalline product is obtained containing about 97 to 99% of a pyridine-isophthalic acid salt which is readily decomposable as hereinbefore described, to a product containing 97 to 99% isophthalic acid in a yield of about 50% based on the isophthalic acid originally present in the mixture.

By carrying out the process of this invention as hereinbefore described, unique results are obtained, especially in view of the fact that the prior use of aqueous solutions of tertiary amine salts was said to produce on cooling a first crystallized fraction consisting of either the tertiary amine salt of terephthalic acid or enriched in terephthalic acid tertiary amine salt. Such a process is described and illustrated in U.S. Patent 2,664,440. To obtain a product of at least 95% isophthalic acid an involved complex salting out procedure is employed by the process described in this patent where pyridine is employed as the tertiary amine. A terephthalic acid product is obtained as first crystallized fraction and not until a fourth crystallization product is produced is a 95% isophthalic acid product obtained. It is readily apparent that such a process is extremely involved, especially with respect to the recovery of an isophthalic acid product containing at least 95% isophthalic acid, for there are many handlings of the solutions involving transferring from one vessel to another, numerous filtrations and washings, all of which inherently result in a substantial handling loss.

By contrast, in the practice of the present invention, an extremely high recovery of high purity isophthalic acid is obtained as a first crystallized product. Also when the process is carried out in a sequential cyclic operation by fortifying the mother liquor with pyridine and contacting the fortified liquor with the isophthalic-terephthalic acids extrahend there is always obtained an exceptionally high yield of an isophthalic acid product containing 95% or more isophthalic acid. Thus the process of this invention produces unique results, involves a minimum of procedural steps, is readily adaptable to industrial practice and eliminates the disadvantages of the process as previously disclosed.

The process of this invention will be more clearly understood from the following illustrative examples. In these examples the term "part" is employed to indicate part by weight.

*Example 1*

There is combined 37.2 parts of pyridine and 20 parts of a mixture containing 84% isophthalic acid and 16% terephthalic acid. The resulting mixture is heated to give a clear solution at 93° C. The clear solution is cooled to room temperature (about 25° C.) and on standing at room temperature, forms a crystalline solid. The crystalline solid is recovered by filtration. The recovered solid is decomposed at 100° C. at reduced pressure and by passing air through the recovered solids to hasten the liberation of pyridine. By this process, 7.68 parts of solid having an acid number of 676 is recovered, containing 94.9% isophthalic acid.

*Example 2*

An isophthalic acid-terephthalic acid mixture 20.2 parts, containing 84% of the former and 16% of the latter, is suspended in a solution containing 100 parts of water and 21.2 parts of pyridine. The resulting mixture is heated about three hours on a steam bath but complete solution does not occur. An additional 200 parts of water is added in small portions while maintaining the mixture at about 100° C. There remains in the resulting clear solution some suspended undissolved solids. The resulting suspension is filtered hot. This filtrate on cooling to about room temperature yields a solid product which is separated from its mother liquor by filtration. The mother liquor is evaporated under reduced pressure at 41° C. to about 82% of its original volume. A third solid forms which is recovered by filtration. The last recovered filtrate is evaporated completely to dryness, leaving a fourth solid product. All of the solid products so obtained are dried by drawing air heated to 100° C. through the solids. From analysis of the products, it is found that the recovered undissolved solid contains about 62% isophthalic acid. The first crystalline solid (obtained at room temperature) contains 98.4% isophthalic acid. The second solid obtained (from the evaporation at 41°) contains 96.7% isophthalic acid. The product recovered as a residue from the complete evaporation of the last filtrate contains about 82% isophthalic acid. By combining the isophthalic acid products obtained from the first and second crystallized products, there is obtained a composite isophthalic acid product containing 97.1% isophthalic acid and representing 33% of the isophthalic acid in the mixture originally charged.

Additional isophthalic acid can be recovered by combining the undissolved solid and the residue and repeating the steps of this process. The isophthalic acid product obtained by repeating the extraction and separation procedure described above will contain at least 95% isophthalic acid.

*Example 3*

To a reaction vessel having a reflux consenser attached thereto, there is added 39 parts of pyridine and 20.4 parts of a mixture of 84% isophthalic and 16% terephthalic acid. The resulting mixture is heated to its boiling point and is maintained under reflux conditions. An opaque solution is obtained which is converted to clear solution by adding 50 parts of water thereto. The resulting solution remains clear on standing at room temperature. To the clear solution at room temperature 20 parts of water are added and a crystalline product forms. Long needles form after the resulting mixture stands at room temperature overnight. This crystalline product is recovered by filtration, dried and stripped of pyridine at reduced pressure with a flow of air at 100° C. through the filter cake. An analysis of this product shows that it contains 97.4% isophthalic acid.

The first filtrate is concentrated at 41° C. at reduced pressure. A crystalline solid forms which is recovered by filtration. This product is stripped of pyridine either by drawing heated air or inert gas such as nitrogen through the filter cake or by drying the filter cake at reduced pressure with a flow of air through the filter cake. The solid product stripped of pyridine contains about 94.6% isophthalic acid.

The residue obtained by evaporation of the second filtrate to dryness contains about 68.2% isophthalic acid.

By combining the first and second isophthalic acid products there is obtained an excellent yield, about 50% based on the mixed acids charged, of product containing at least 95% isophthalic acid.

*Example 4*

There is stirred 40 parts of the mixture containing 86% isophthalic acid and 14% terephthalic acid and an aqueous pyridine containing 19.1 parts of pyridine and 300 parts of water at 90° C. for one hour. The resulting suspension is filtered at 90° C.; and the filtrate is recovered so that no vapor loss occurs. The recovered filtrate is cooled to about 25° and a crystalline solid forms. This crystalline solid is recovered and stripped of pyridine with heated air. The resulting product was found by analysis to contain 98.8% isophthalic acid. The second filtrate is concentrated by removal of about 28% of the aqueous pyridine solvent and a second crystalline solid forms which is recovered and stripped of pyridine. This second product by analysis contains 98.7% isophthalic acid.

The third filtrate is evaporated to dryness and the residue obtained is stripped of pyridine. An analysis of the resulting product shows it to contain about 81% isophthalic acid. This product can be combined with the undissolved solids, which contain about 78% isophthalic acid and recycled to the separation process.

The composite product obtained by combining the first and second isophthalic acid products of the above process, each containing more than 98% isophthalic acid, represents the recovery of about 27% of the isophthalic acid originally present in the mixture charged or about 52% of the isophthalic acid taken into solution.

*Example 5*

A cyclic process embodying the features of the process of this invention is carried out in the following manner.

A mixture containing 84% isophthalic acid and 16% terephthalic acid is stirred with aqueous pyridine at 90° C. for one hour. The ratio of material employed is 0.5 part of pyridine and 7.5 parts of water per part of the mixture of acid. The resulting suspension is filtered to recover the undissolved solids which are retained for a subsequent pyridine reaction step. The resulting filtrate is cooled to room temperature and a crystalline product containing isophthalic acid dipyridinium salt forms. The dipyridinium salt is recovered from the mother liquor and stripped of pyridine by heating at 110° C. The resulting isophthalic acid product contains 98.8% isophthalic acid and represents a yield of about 20% by weight based on the mixed acid dissolved.

The mother liquor is fortified with an amount of pyridine equivalent to the amount of pyridine which was combined with the 98.8% isophthalic product. This fortified solution is reacted at 90° C. with the undissolved solids for one hour. A suspension results which is filtered hot as before, saving the undissolved solids for a subsequent pyridine reaction step. The resulting hot filtrate is cooled to room temperature and likewise deposits dissolved acids as the dipyridinium salt, which is recovered and stripped of pyridine resulting in a product containing 98.8% isophthalic acid. Fortifying and recycling the cooled mother liquor to the reacting step is repeated. After repeating this procedure a total of about 9 times (including the two described above) substantially all of the isophthalic acid is recovered as a 98.8% isophthalic acid product, and there remains a final undissolved product containing about 99% terephthalic acid when stripped or pyridine.

The dissolving step of the process of this invention may be carried out at any desired temperature above 20° C., for example from 20 to 200° C. or higher. When temperatures of above the boiling point of the reaction mixtures of isomeric phthalic acids, pyridine with or without water are employed, provisions must be made for the recovery of the aqueous pyridine vaporized. Alternatively, at temperatures above 100° C. pressure equipment may be used. For the preferred process of this invention, where pyridine is reacted with the mixed acids in the aqueous medium, extraction temperatures in the range of 50° C. to 100° C. are preferred at atmospheric pressure and temperatures up to about 150° C. at elevated pressures.

As illustrated in the examples, complete solution of the pyridine salt need not occur, nor is it necessary to form the dipyridinium salt of all of the mixed acid treated; the undissolved solids can be removed first without a deleterious effect upon the production of an isophthalic acid product of high purity. In addition, although the recovery of the first high purity isophthalic acid product is shown to have been obtained at about room temperature, crystallizing temperatures which provide a first crystalline fraction containing at least 95% isophthalic acid pyridine salt in an amount representing about one-half thereof in solution, are satisfactory.

What is claimed is:

1. A process for separating a mixture of isophthalic acid and terephthalic acid containing 80 to 90% isophthalic acid consisting of reacting said mixture with pyridine in an amount in the range of from 1 to 4 moles of pyridine per mole of phthalic acid in said mixture, crystallizing first from the liquid phase of said reaction mixture a crystalline product containing at least 95% isophthalic acid pyridine salt and amounting to about one-half thereof in solution, separating the solid pyridine salt from the remaining liquid, decomposing the pyridine salt at a temperature up to 116° C. whereby an isophthalic acid product containing at least about 95% isophthalic acid is obtained.

2. A process for the separation of a mixture of isophthalic acid and terephthalic acid containing 80 to 90% isophthalic acid consisting of forming an aqueous solution of the product of the reaction of said mixture of phthalic acids and from 1 to 4 moles of pyridine per mole of phthalic acids in said mixture, cooling said aqueous solution to crystallize first a product containing at least 95% isophthalic acid pyridine salt and amounting to about one-half thereof in solution, separating the pyridinium salt from the mother liquor, decomposing the pyridinium salt at a temperature up to about 116° C. C. whereby an isophthalic acid product of at least 95% purity is obtained.

3. The process of claim 2 wherein the aqueous solution is prepared by fortifying the mother liquor with pyridine.

4. A process for the separation of mixtures of isophthalic acid and terephthalic acid containing 80 to 90% isophthalic acid consisting of heating to a temperature up to about 116° C. said mixed acids with an aqueous solution of pyridine containing at least 0.5 part by weight of water per part of pyridine and containing from 1 to 4 moles of pyridine per mole of phthalic acid, crystallizing first a solid pyridinium isophthalic acid salt by cooling the resulting aqueous solution to crystallize a product containing at least 95% isophthalic acid pyridine salt in an amount of at least one-half thereof in solution, separating the resulting pyridinium salt from the mother liquor, decomposing the pyridinium salt by passing an inert gas therethrough at a temperature up to about 116° C. whereby an isophthalic acid product containing at least 95% isophthalic acid is produced.

5. A process for separating mixtures of isophthalic acid and terephthalic acid containing 80 to 90% isophthalic acid consisting of heating said mixture in the presence of an aqueous pyridine solution containing from 10 to 20 parts by weight of water per part by weight of pyridine and containing 1 to 4 moles of pyridine per mole of phthalic acid in said mixture at a temperature up to about 100° C., crystallizing first a solid pyridinium isophthalic acid salt from the solution at a temperature in the range of 20 to 30° C., separating the solid pyridinium salt from the mother liquor, decomposing the pyridinium salt at a temperature up to about 100° C. whereby an isophthalic acid product containing at least about 95% isophthalic acid is produced.

6. The process for recovering an isophthalic acid product of at least 95% purity from a mixture of 84 to 86% isophthalic acid and 14 to 16% terephthalic acid consisting of heating at a temperature in the range of 85 to 95° C. said mixture with an aqueous solution of pyridine containing about 15 parts by weight of water per part by weight of pyridine and containing from 1 to 4 moles of pyridine per mole of phthalic acid in said mixture, crystallizing first from the aqueous solution a solid pyridinium isophthalic acid salt at a temperature in the range of 20 to 30° C. recovering the solid pyridinium salt, decomposing the solid pyridinium salt by passing inert gas therethrough at a temperature up to about 100° C. whereby an isophthalic acid product containing at least 95% isophthalic acid is obtained.

7. The process of claim 6 wherein the aqueous pyridine solution reacted with the mixture of isophthalic acid and terephthalic acid contains about 1 mole of pyridine per mole of phthalic acid in said mixture.

8. The process of separating an isophthalic acid product containing at least about 95% isophthalic acid from a mixture containing about 85 to 90% isophthalic acid and 10 to 15% terephthalic acid consisting of reacting at 90 to 95° C. said mixture with pyridine in an amount of pyridine forming a clear solution of all said mixture, cooling the resulting solution to about 20 to 30° C. recovering the solids formed, decomposing said solids with air heated up to 100° C. thereby obtaining an isophthalic acid product containing about 95% isophthalic acid.

References Cited in the file of this patent

UNITED STATES PATENTS 2,664,440    Toland _____ Dec. 29, 1953